UNITED STATES PATENT OFFICE.

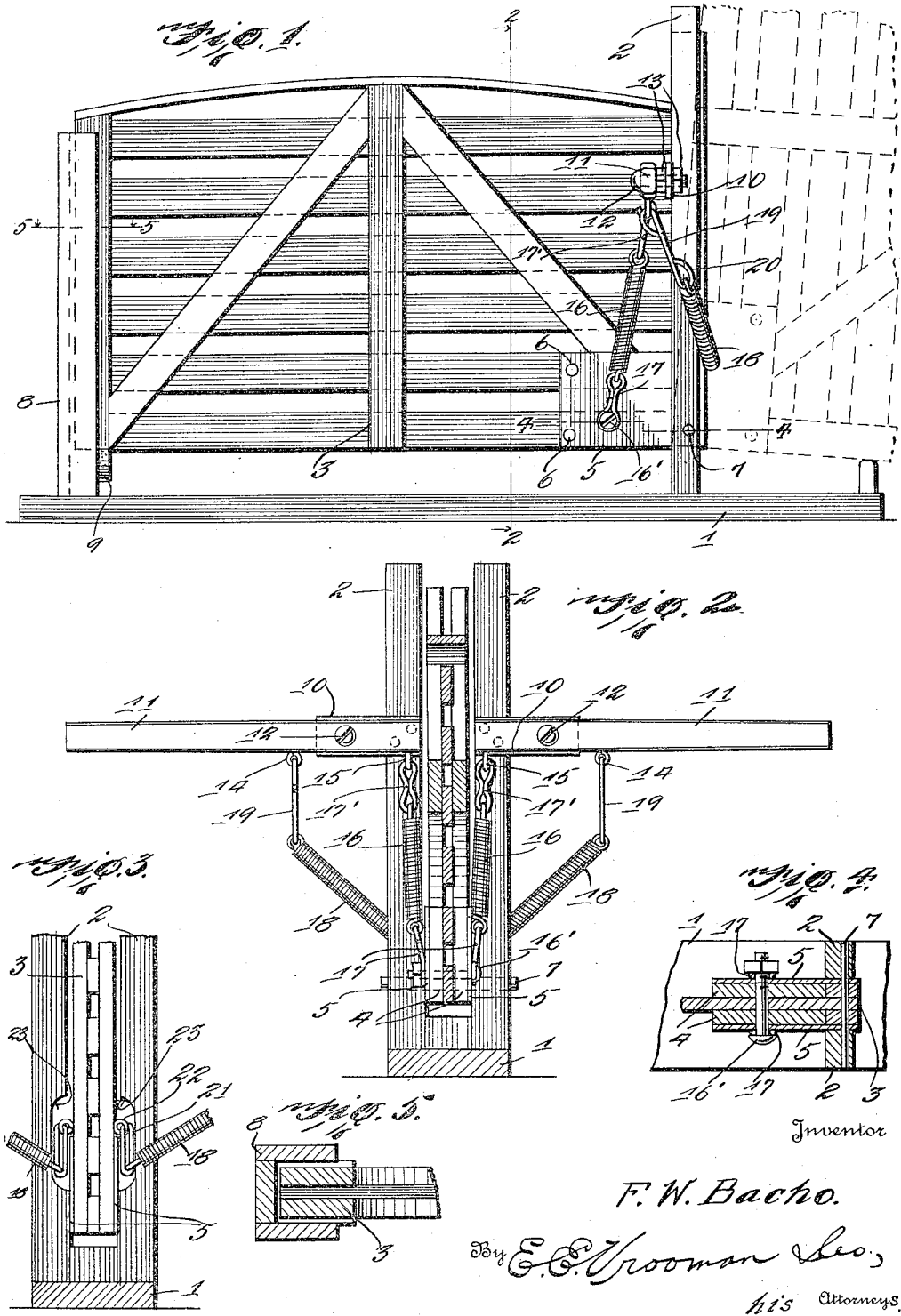

FREDERICK WILLIAM BACHO, OF BILOXI, MISSISSIPPI.

FARM-GATE.

1,224,353. Specification of Letters Patent. Patented May 1, 1917.

Application filed July 10, 1916. Serial No. 108,394.

*To all whom it may concern:*

Be it known that I, FREDERICK WILLIAM BACHO, a citizen of the United States of America, residing at Biloxi, in the county of Harrison and State of Mississippi, have invented certain new and useful Improvements in Farm-Gates, of which the following is a specification, reference being had therein to the accompanying drawing.

This invention relates to a farm gate and has for its principal object the production of a gate which is so mounted as to be easily swung to an open position upon the operation of the levers.

Another object of this invention is the production of a farm gate which is pivotally mounted upon supporting standards so that when either lever is operated the gate may be swung either to an open or closed position as desired, swinging in a vertical plane.

Another object of this invention is the production of a farm gate which is pivotally mounted upon its supporting standards so as to move in a vertical plane, while each lever is connected thereto by means of springs and link members so that the gate may be swung to an open or closed position.

With these and other objects in view this invention consists of certain novel combinations, constructions, and arrangements of parts as will be hereinafter fully described and claimed.

In the accompanying drawing:—

Figure 1 is a side elevation of the farm gate as constructed in accordance with this invention.

Fig. 2 is a vertical section taken on the line 2—2 of Fig. 1, looking in the direction of the arrows.

Fig. 3 is a fragmentary rear elevation of the gate.

Fig. 4 is a section taken on the line 4—4 of Fig. 1.

Fig. 5 is a section taken on the line 5—5 of Fig. 1, looking in the direction of the arrows.

Referring to the accompanying drawing by numerals it will be seen that the farm gate as herein disclosed comprises a base 1 having vertical parallel standards 2 carried thereon, although it is, of course, obvious that in use these standards may be driven into the ground and supported in the usual manner instead of employing a base, as shown at 1. The gate 3 may be of any suitable construction and is provided with a block 4 upon each side thereof adjacent its rear end, as shown clearly in Fig. 4, these blocks being covered by the plates 5, which blocks and plates are retained upon the gate by means of the pins or other securing members 6. A pin 7 passes through the standards 2 and also through the rear portions of the gate 3 so as to pivotally support the gate 3 upon the standards. Thus, it will be seen that the gate may be swung in a vertical position between the standards 2, as shown in dotted lines in Fig. 1 to an open position, although it will normally remain in a closed position as shown in full lines in Fig. 1. It will be seen that the post 8 carried upon the base 1 is formed of a number of strips, as shown in Fig. 5, to comprise a U-shaped post within which the forward end of the gate 3 normally fits. It will be seen that a buffer 9 may be positioned within the U-shaped post 8 so as to constitute a buffer for the gate as the same is swung to a closed position.

The plates 10 are fixedly mounted in any suitable manner upon the standards 2 and these plates 10 extend in opposite directions, as shown clearly in Fig. 2. A lever 11 has a bolt 12 passing therethrough which bolt 12 carries nuts 13 thereon embracing each side of the plate 10, thereby pivotally supporting a lever upon each plate. It is, of course, obvious that each plate is adapted to support a lever so that a lever will be carried upon each side of the gate. Each lever is provided with an eye 14 intermediate its ends or adjacent its central portion and with an eye 15 adjacent its inner end portion so that the eyes 14 and 15 will be carried upon opposite sides of the pivot bolt 12 of the particular lever. The lifting spring 16 has its lower end connected by a one-piece link 17 to a bolt 18 passing through the plates 5, blocks 4, and gate 3. The upper end of the spring 16 is connected by a one-piece link 17' to the eye 15. These links 17 and 17' are formed alike, being formed of a single strand of wire so as to constitute one-piece structures of a figure 8 construction so as to positively prevent the links from accidentally disengaging the lifting spring 6. Thus, it will be seen that as downward pressure is exerted upon the outer end of a lever 11 the inner end of the lever will be swung upwardly, thereby drawing upwardly upon the lifting spring 16. This action will cause the spring to draw upwardly by means of the links 17 and 17' upon the gate 3, for swinging the gate to an open position, as indicated in dotted lines in Fig. 1. When, however, it is desired to move the gate to a closed position the lever may be swung upwardly at its outer end so that the closure spring 18 will be operated. The closure spring is connected to the eye 14 by means of a link 19 having looped ends 20, thereby holding the closure spring in engagement with the lever 11. The lower end of the spring 18 has closed links 21 engaging its lower end and also being secured to the eyes 22 carried by the gate 3. It will be seen that the standards 2 are provided with the enlarged notched portions 23 adjacent their lower ends so as to provide sufficient space for the reception of the eyes 22 of the links 21. As the outer end of the lever is swung upwardly it will be seen that the link 19 will draw upwardly upon the spring 18, thereby causing the link 21 to draw upwardly upon the gate. It will be seen by referring particularly to Fig. 3 that these links are secured to the gate adjacent its rear portion although at a distance from the lower portion thereof so that when the gate is in an open position the spring can draw upwardly upon the gate for swinging the same toward a closed position. It is, of course, obvious that a plurality or pair of these operating levers are carried so that the gate may be opened or closed upon either side thereof, while the employment of the springs will cause the gate to operate very efficiently. It is, of course, obvious that by the employment of the springs sudden jarring or strain is greatly reduced, since these springs will constitute shock absorbers for absorbing undue jarring or shocking of the structure of the gate when the same is being operated. Furthermore, it will be seen that the construction of the links upon the ends of the springs will positively hold the springs in engagement with the gate and with the levers so as to cause the structure to be in condition for efficient operation at all times.

It is, of course, obvious that many minor detail changes may be made in the construction of this invention without departing from the spirit thereof, such for instance, as the addition of a weight at the upper end of the gate so as to counterbalance the same, or in the construction of the links, or like elements. Therefore, it is not intended to limit the construction of this gate to the specific form as herein disclosed, but to include all such forms as properly come within the scope of the invention as claimed.

What is claimed is:—

1. In a gate of the class described, the combination of a plurality of spaced standards, a gate pivotally mounted upon said standards and being adapted to be swung in a vertical plane, plates carried by said standards and extending outwardly therefrom, levers pivotally mounted upon said plates, eyes carried by said levers upon each side of the pivot points thereof, one-piece links secured to said eyes, springs secured to said links, said gate being provided with eyes and with a bolt, links connecting said springs to said eyes and said bolt, whereby as said levers are swung said gate may be moved to an open or closed position.

2. In a gate of the class described, the combination of a plurality of base standards, said standards having enlarged notches adjacent their lower ends, a gate pivotally mounted upon said standards and being adapted to be swung therebetween, plates carried by said standards and extending outwardly therefrom, levers pivotally mounted upon said plates, an eye carried by each lever adjacent the inner end thereof, each lever also provided with an eye adjacent its central portion, a bolt passing through said gate adjacent its lower portion and spaced from the rear end thereof, eyes carried by said gate adjacent its rear end and spaced from the lower ends thereof, said eyes extending into said notched portions of said standards, one-piece links being secured to said bolt, springs being secured to said links, links securing the upper ends of said springs to said eyes at the inner ends of said levers, whereby as said levers are swung downwardly the gate will be moved to an open position, links being secured to said eyes of said gate within said notches, springs being secured to said last-mentioned links, links being secured to said last-mentioned springs, said last-mentioned links being secured to the eyes of said levers adjacent their central portion, whereby as the upper ends of said levers are swung upwardly said gate will be swung to a closed position.

3. In a device of the class described, the combination of a standard, a gate pivotally mounted upon said standard and being adapted to be swung in a vertical plane, a lever pivotally mounted upon said standard, links carried by said lever upon each side of the pivot thereof, links connected to the rear and lower portions of said gate, springs connecting said first-mentioned links with said last-mentioned links, whereby when said lever is swung said gate will be swung to either an open or closed position.

In testimony whereof I hereunto affix my signature.

FREDERICK WILLIAM BACHO.